United States Patent
Katagiri et al.

(10) Patent No.: US 10,935,789 B2
(45) Date of Patent: Mar. 2, 2021

(54) IMAGE DISPLAY APPARATUS AND IMAGE DISPLAY METHOD

(71) Applicant: HONDA MOTOR CO., LTD., Tokyo (JP)

(72) Inventors: Kiyoshi Katagiri, Wako (JP); Shiro Fukano, Wako (JP); Tetsuro Hosoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 16/084,593

(22) PCT Filed: Feb. 15, 2017

(86) PCT No.: PCT/JP2017/005508
§ 371 (c)(1),
(2) Date: Sep. 13, 2018

(87) PCT Pub. No.: WO2017/169230
PCT Pub. Date: Oct. 5, 2017

(65) Prior Publication Data
US 2019/0079290 A1    Mar. 14, 2019

(30) Foreign Application Priority Data

Mar. 31, 2016    (JP) .............................. JP2016-073634

(51) Int. Cl.
*G06F 3/00* (2006.01)
*G02B 27/01* (2006.01)
(Continued)

(52) U.S. Cl.
CPC ....... *G02B 27/0172* (2013.01); *G01C 21/365* (2013.01); *G02B 27/017* (2013.01);
(Continued)

(58) Field of Classification Search
CPC .. G02B 27/0172; G02B 27/017; G02B 27/02; G02B 2027/014; G02B 2027/0141;
(Continued)

(56) References Cited

U.S. PATENT DOCUMENTS

| 9,041,741 | B2 | 5/2015 | Mabbutt et al. |
| 2008/0195315 | A1* | 8/2008 | Hu ..................... G01C 21/3647 |
| | | | 701/455 |

(Continued)

FOREIGN PATENT DOCUMENTS

| CN | 101518045 | 8/2009 |
| CN | 103129555 | 6/2013 |

(Continued)

OTHER PUBLICATIONS

Extended European Search Report for European Patent Application No. 17773778.0 dated Feb. 18, 2019.

(Continued)

*Primary Examiner* — Geepy Pe
*Assistant Examiner* — Tiffany P Ohman
(74) *Attorney, Agent, or Firm* — Amin, Turocy & Watson, LLP (57) ABSTRACT

An image display apparatus having a display part that is arranged on a mount body which is mounted on the head of a user includes a detection part and a control part. The detection part detects a tilt of the head of the user. The control part sets a virtual horizon based on the tilt which is detected by the detection part and sets a non-display region having a band shape that is parallel to the set virtual horizon.

8 Claims, 10 Drawing Sheets

(51) Int. Cl.
*G06F 3/01* (2006.01)
*G06F 3/0484* (2013.01)
*G02B 27/02* (2006.01)
*G06F 3/0487* (2013.01)
*G09G 5/00* (2006.01)
*G09G 5/36* (2006.01)
*G06F 3/147* (2006.01)
*G01C 21/36* (2006.01)
*G08G 1/0968* (2006.01)
*G08G 1/0969* (2006.01)
*B62J 45/40* (2020.01)
*B62J 45/415* (2020.01)
*B62J 50/20* (2020.01)

(52) U.S. Cl.
CPC ............ *G02B 27/02* (2013.01); *G06F 3/012* (2013.01); *G06F 3/0484* (2013.01); *G06F 3/0487* (2013.01); *G06F 3/147* (2013.01); *G08G 1/0969* (2013.01); *G08G 1/096861* (2013.01); *G09G 5/00* (2013.01); *G09G 5/36* (2013.01); *B62J 45/40* (2020.02); *B62J 45/4151* (2020.02); *B62J 50/20* (2020.02); *G02B 2027/014* (2013.01); *G02B 2027/0141* (2013.01); *G02B 2027/0174* (2013.01); *G02B 2027/0178* (2013.01); *G02B 2027/0187* (2013.01); *G09G 2340/04* (2013.01); *G09G 2340/12* (2013.01); *G09G 2380/10* (2013.01)

(58) Field of Classification Search
CPC .... G02B 2027/0174; G02B 2027/0178; G02B 2027/0187; G01C 21/365; G06F 3/012; G06F 3/0484; G06F 3/0487; G06F 3/147; G08G 1/096861; G08G 1/0969; G09G 5/00; G09G 5/36; G09G 2340/04; G09G 2340/12; G09G 2380/10; B62J 50/20; B62J 45/40; B62J 45/4151

USPC ........................................................ 701/431
See application file for complete search history.

(56) References Cited

U.S. PATENT DOCUMENTS

2009/0128938 A1    5/2009  Carnes
2014/0267400 A1*   9/2014  Mabbutt ................. G06F 1/163
                                                  345/633
2017/0358108 A1*  12/2017  Descheemaeker ..... B64D 43/02

FOREIGN PATENT DOCUMENTS

| JP | 03-255419    | 11/1991 |
| JP | 2000-284214  | 10/2000 |
| JP | 2002-302822  | 10/2002 |
| JP | 2008-026075  | 2/2008  |
| JP | 2009-092809  | 4/2009  |
| JP | 2014-098564  | 5/2014  |
| JP | 2015-161930  | 9/2015  |
| JP | 2015-202842  | 11/2015 |
| WO | 2006-035755  | 4/2006  |
| WO | 2015-114807  | 8/2015  |
| WO | 2015/128212  | 9/2015  |

OTHER PUBLICATIONS

International Search Report and Written Opinion for International Patent Application No. PCT/JP2017/005508 dated May 16, 2017, 8 pages.
Japanese Office Action for Japanese Patent Application No. 2018-508545 dated Aug. 20, 2019.
Chinese Office Action for Chinese Patent Application No. 201780018201.6 dated Dec. 2, 2020.

* cited by examiner

IMAGE DISPLAY APPARATUS AND IMAGE DISPLAY METHOD

TECHNICAL FIELD

The present invention relates to an image display apparatus and an image display method.

Priority is claimed on Japanese Patent Application No. 2016-073634, filed on Mar. 31, 2016, the contents of which are incorporated herein by reference.

BACKGROUND

Recently, image display apparatuses that are used while being mounted on the head have been developed. As such image display apparatuses, a non-transmission-type apparatus that covers the eyes and a transmission-type apparatus that does not cover the eyes are known. In the non-transmission-type apparatus, only an image is displayed on a display part. Therefore, a user can view only the image. In the transmission-type apparatus, a display part is, for example, a half mirror. Therefore, the user can view an image and an external view.

Recently, as shown in Patent Document 1 and Patent Document 2, techniques have been proposed in which, by using such image display apparatuses, information from a vehicle is acquired, and the acquired information is displayed as an image. The information from the vehicle is, for example, navigation information, information of a vehicle speed, and the like.

RELATED ART DOCUMENTS

Patent Documents

[Patent Document 1] Japanese Unexamined Patent Application, First Publication No. 2000-284214

[Patent Document 2] Japanese Unexamined Patent Application, First Publication No. 2015-202842

SUMMARY OF INVENTION

Problems to be Solved by the Invention

When driving a two-wheel vehicle and the like while mounting such an image display apparatus, it is necessary for a displayed information image not to affect the sight of a driver of the vehicle. In Patent Document 1, a technology is disclosed in which, in a motorcycle helmet on which a head mount display is mounted, when a driver rotates the head during traveling on a curve and the like, the display is stopped such that the information image does not interfere with the sight of the user. However, in the case of Patent Document 1, while the driver is rotating the head, since the information is not displayed, it is impossible for the driver to acquire vehicle information while the information is not displayed, and there is a possibility that the convenience of displaying information using the image display apparatus may be degraded. Further, in Patent Document 1, since the image is erased by the driver rotating the head, the driver may perform a motion such that the head is excessively rotated when confirming the side direction.

In Patent Document 2, a non-display region having a rectangular shape is set at a center part of sight, and the non-display region is moved in accordance with an attitude state of a vehicle that is detected by a gyro sensor. However, in Patent Document 2, the non-display region has a rectangular shape. When the non-display region is provided to have a rectangular shape, specifically in a case where a field of view is limited by a helmet, there is a possibility that a displayable region is excessively limited. Further, when the non-display region has a rectangular shape, information may be displayed at a right or left position. There is a problem in that, when information is displayed at a side position of the center of the visual line of a driver, it is difficult for the driver to instantly confirm the environment.

An object of an aspect of the present invention is to provide an image display apparatus and an image display method capable of displaying a required information image without the information image affecting the sight of a vehicle driver.

Means for Solving the Problem

<1> An image display apparatus according to an aspect of the present invention is an image display apparatus having a display part that is arranged on a mount body which is mounted on the head of a user, the image display apparatus including: a detection part that detects a tilt of the head of the user; and a control part that sets a virtual horizon based on the tilt which is detected by the detection part and that sets a non-display region having a band shape which is parallel to the virtual horizon.

<2> In the image display apparatus described above, the non-display region may be a region between a first boundary line that is provided by a first distance in an upper direction from and in parallel with the virtual horizon and a second boundary line that is provided by a second distance in a lower direction from and in parallel with the virtual horizon.

<3> In the image display apparatus described above, the first distance may be shorter than the second distance.

<4> The image display apparatus described above may include a speed detection part that detects a movement speed, wherein the control part may change a relationship between the first distance and the second distance in accordance with the movement speed that is detected by the speed detection part.

<5> In the image display apparatus described above, the control part may shorten the second distance when the movement speed that is detected by the speed detection part is fast, and the control part may shorten the first distance when the movement speed is slow.

<6> In the image display apparatus described above, when an information image and a region that is set as the non-display region are overlapped with each other, the control part may erase the information image.

<7> In the image display apparatus described above, when an information image and a region that is set as the non-display region are overlapped with each other, the control part may shrink the information image to a size in which the information image is not overlapped with the non-display region and display the shrunk information image.

<8> In the image display apparatus described above, the display part may simulate a three-dimensional space on a virtual spherical body that centers a user, may project the information image on a spherical surface of the virtual spherical body, and may form the non-display part on the spherical surface in an annular band shape.

<9> An image display method according to another aspect of the present invention is an image display method which controls an image display apparatus having a display part that is arranged on a mount body which is mounted on the head of a user, the image display method including: by way of a detection part, detecting a tilt of the head of the user; and by way of a control part, setting a virtual horizon based on the detected tilt and setting a non-display region having a band shape that is parallel to the virtual horizon.

Advantage of the Invention

According to the configuration <1> or <9>, the non-display region is set in the band shape based on the virtual horizon, and therefore, it is possible to ensure a field of view of the driver in the right-to-left direction on which the visual line of the driver concentrates. Further, according to the configuration <1> or <9>, by setting the virtual horizon based on the tilt, even when traveling on a curve while tilting the vehicle body and the like, it is possible to ensure the sight of the driver.

According to the configuration <2>, the non-display region is a region between the first boundary line that is provided above by a first distance and parallel to the virtual horizon and the second boundary line that is provided below by the second distance and parallel to the virtual horizon, and the first distance and the second distance are appropriately set. Thereby, it is possible to optimally set the non-display region in accordance with a drive condition.

According to the configuration <3>, the first distance from the virtual horizon to the upper boundary line is shorter than the second distance from the virtual horizon to the lower boundary line, and thereby, it is possible to obtain a large information display part while ensuring a range for which confirmation during traveling is required.

According to the configuration <4>, it is possible to ensure an optimal non-display region in accordance with a vehicle movement speed.

When the speed is fast, with respect to the lower region of the virtual horizon which is close to the user, the frequency of confirming a road situation and the like by the user is decreased. According to the configuration <5>, when the travel speed is fast, by shortening the second distance from the virtual horizon to the lower boundary line, it is possible to obtain a large information display part while ensuring a range for which confirmation during traveling is required. Further, according to the configuration <5>, when the travel speed is slow, by shortening the first distance from the virtual horizon to the upper boundary line, it is possible to obtain a large information display part while ensuring a range for which confirmation during traveling is required.

According to the configuration <6>, when the information image and the region that is set as the non-display region are overlapped with each other, by erasing the information image, it is possible to ensure the sight of the driver.

According to the configuration <7>, when the information image and the region that is set as the non-display region are overlapped with each other, by shrinking and displaying the information image, it is possible to ensure the sight of the driver, and it is possible to acquire required information.

According to the configuration <8>, by forming the non-display part on the spherical surface to have an annular band shape, it is possible to simulate a three-dimensional space on a virtual spherical body that centers a user and to set the non-display region at the display part that projects the information image on the spherical surface of the spherical body.

DESCRIPTION OF THE EMBODIMENTS

Hereinafter, embodiments of the present invention will be described with reference to the drawings.

First Embodiment

The present embodiment is described using an example of a glasses-type head mount display (hereinafter, referred to as a HMD) as an image display apparatus.

Figure 1:
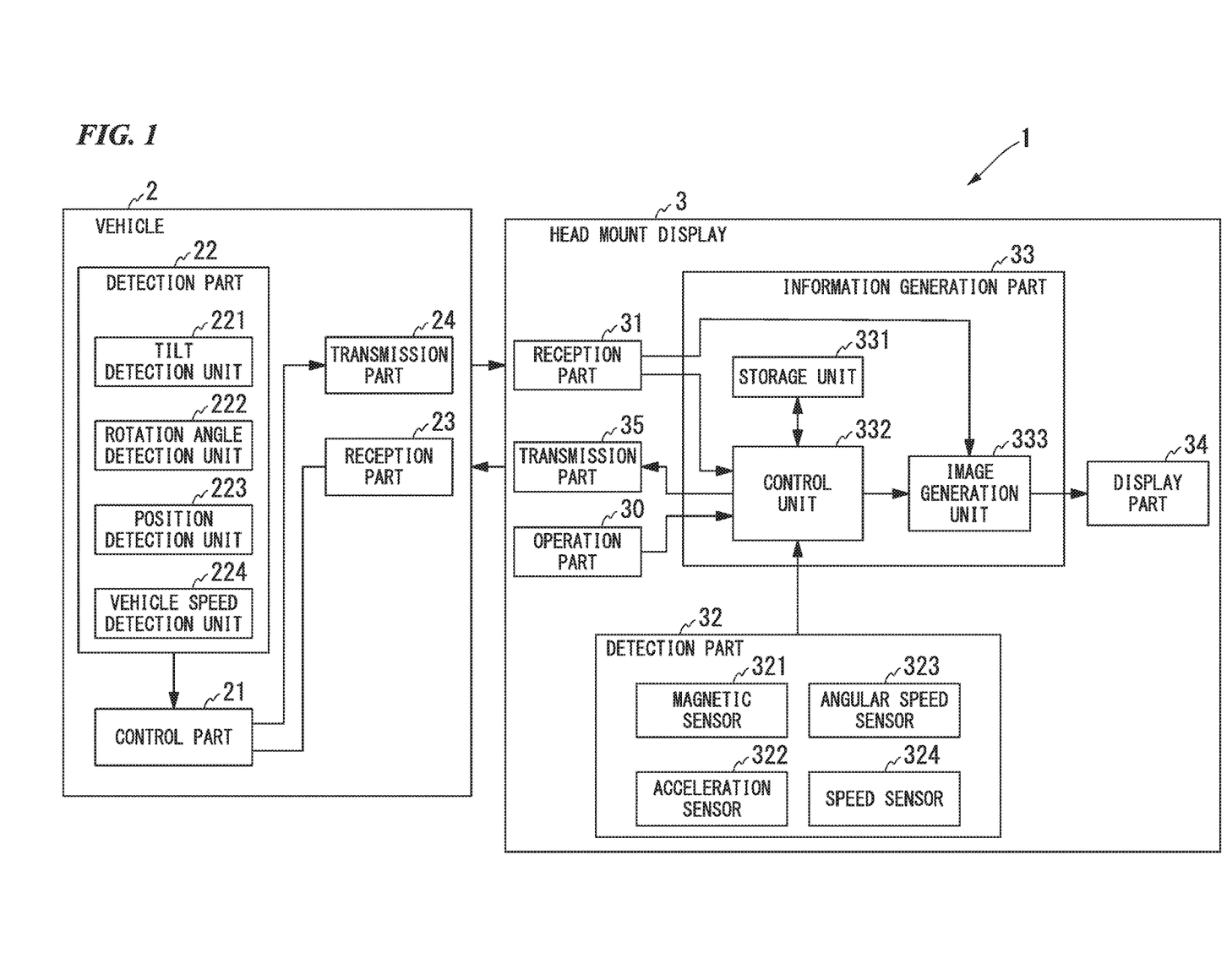
FIG. 1 is a block diagram showing a schematic configuration of a vehicle detection system according to a first embodiment.

FIG. 1 is a block diagram showing a schematic configuration of a vehicle detection system 1 according to the present embodiment. As shown in FIG. 1, the vehicle detection system 1 includes a vehicle 2 and a head mount display 3 (hereinafter, also referred to as a HMD 3) (image display apparatus).

The vehicle 2 and the HMD 3 communicate, for example, by using a short-distance wireless communication standard. The short-distance wireless communication standard is, for example, a communication of a Bluetooth (registered trademark) LE (Low Energy) (hereinafter, referred to as a BLE) standard.

First, the vehicle 2 is described.

The vehicle 2 is, for example, a saddle-riding-type vehicle such as a motorcycle. The vehicle 2 includes a control part 21, a detection part 22, a reception part 23, and a transmission part 24. The detection part 22 includes a tilt detection unit 221, a rotation angle detection unit 222, a position detection unit 223, and a vehicle speed detection unit 224. The detection part 22 may further include a fuel remaining amount detection unit, a vibration detection unit, a key detection unit, an air pressure detection unit, and the like.

The control part 21 performs a variety of processes based on information from the detection part 22. Further, the control part 21 generates a detection signal based on the information from the detection part 22 and outputs the generated signal to the transmission part 24. Further, information from the HMD 3 that is received by the reception part 23 is input to the control part 21, and a variety of processes are performed.

The tilt detection unit 221 is, for example, a three-axis acceleration sensor. The tilt detection unit 221 detects a tilt of the vehicle 2 and outputs information indicating the detected tilt to the control part 21. The rotation angle detection unit 222 is, for example, a gyro sensor. The rotation angle detection unit 222 detects a rotation angle of the vehicle 2 and outputs information indicating the detected rotation angle to the control part 21. The position detection unit 223 is, for example, a GPS (global Positioning System). The position detection unit 223 detects a current position of the vehicle 2 and outputs information indicating the detected current position as vehicle position information to the control part 21. The vehicle speed detection unit 224 detects a speed of the vehicle 2 and outputs information indicating the detected speed to the control part 21.

The reception part 23 and the transmission part 24 perform transmission and reception of information wirelessly with a transmission part 35 and a reception part 31 of the HMD 3 in accordance with the short-distance wireless communication standard. The reception part 23 receives a signal from the HMD 3 and outputs information based on the received signal to the control part 21. The transmission part 24 generates a transmission signal on the basis of the information that is output by the control part 21 and transmits the generated transmission signal to the HMD 3.

Next, the HMD 3 is described.

The HMD 3 includes an operation part 30, a reception part 31, a detection part 32, an information generation part 33, a display part 34, and a transmission part 35. The information generation part 33 includes a storage unit 331, a control unit 332, and an image generation unit 333.

The HMD 3 receives information that is transmitted by the vehicle 2 and displays a variety of information on the display part 34 in response to the received information. The variety of information includes vehicle speed information, time information, vehicle position information, navigation information, and the like. Further, remaining information of the energy of the vehicle 2, fuel consumption information, information indicating that an abnormality is occurring at the vehicle 2, mail reception information, and the like may be displayed on the display part 34.

The operation part 30 includes, for example, a mechanical switch, a touch panel switch, and the like. The operation part 30 detects a result of operation by a user (in this case, a vehicle driver) and outputs the detected operation command to the control unit 332.

The reception part 31 receives information from the vehicle 2 and outputs the received information to the image generation unit 333. The reception part 31 may receive an operation command from the vehicle 2 and may output the received operation command to the control unit 332. The operation command includes, for example, a command to allow an electric source of the HMD 3 to be in an ON state or an OFF state, a command whether or not to display information on the display part 34, a command to allow which information is to be displayed when the HMD 3 is in some state, and the like.

The detection part 32 includes a magnetic sensor 321, an acceleration sensor 322, an angular speed sensor 323, and a speed sensor 324 (speed detection part). The magnetic sensor 321 is, for example, a geomagnetic sensor. The magnetic sensor 321 detects an azimuth direction of the HMD 3 and outputs the detected detection value to the control unit 332. The acceleration sensor 322 is, for example, a three-axis acceleration sensor. The acceleration sensor 322 detects a three-axis acceleration of the HMD 3 and outputs the detected detection value to the control unit 332. The angular speed sensor 323 is, for example, a three-axis gyro sensor. The angular speed sensor 323 detects a rotation angle acceleration of the HMD 3 and outputs the detected detection value to the control unit 332. The speed sensor 324 detects a movement speed.

When the HMD 3 is mounted by a driver on the head, the detection part 32 detects the tilt of the head of the driver at three axes, namely a roll direction, a pitch direction, and a yaw direction. Here, the tilt in the roll direction is a tilt in a direction of rotation around the front-to-rear direction of the vehicle 2 as a rotation axis. The tilt in the pitch direction is a tilt in a direction of rotation around the right-to-left direction of the vehicle 2 as a rotation axis. The tilt in the yaw direction is a tilt in a direction of rotation around the vertical direction of the vehicle 2 as a rotation axis. By detecting a gravity acceleration using the acceleration sensor 322 and detecting angular speeds in rotation directions of three axes from the angular speed sensor 323, the tilt of the driver's head is detected at three axes of the roll direction, the pitch direction, and the yaw direction.

The information generation part 33 selects information from the information that is received by the reception part 31 in response to the operation command that is output by the operation part 30 and generates display data based on the selected information.

The storage unit 331 stores information in response to a variety of processes of the control unit 332. The storage unit 331 stores a control program that is used by the control unit 332. The control unit 332 performs a variety of processes. Further, in the present embodiment, when displaying an information image on the display part 34, the control unit 332 performs a process of setting a non-display region in response to the detection value from the detection part 32.

The image generation unit 333 acquires information that is output by the reception part 31. The image generation unit 333 acquires a determination result that is output by the control unit 332. The image generation unit 333 selects the acquired information in response to the acquired determination result and generates an image to be displayed on the display part 34 by using the selected information.

The display part 34 includes a projection unit that projects an image and a transmission-type display, for example, using a hologram. The display part 34 allows external light to transmit through the display part 34 and displays an image that is output by the image generation unit 333 by using the hologram. When the HMD 3 is a glasses-type HMD, both of or one of right and left parts of the glasses may include the display part 34. In the display part 34, a three-dimensional space is simulated on a virtual spherical body that centers a driver, and an information image is projected and displayed on a spherical surface of the spherical body.

Next, an example of the appearance of the HMD 3 is described.

Figure 2:
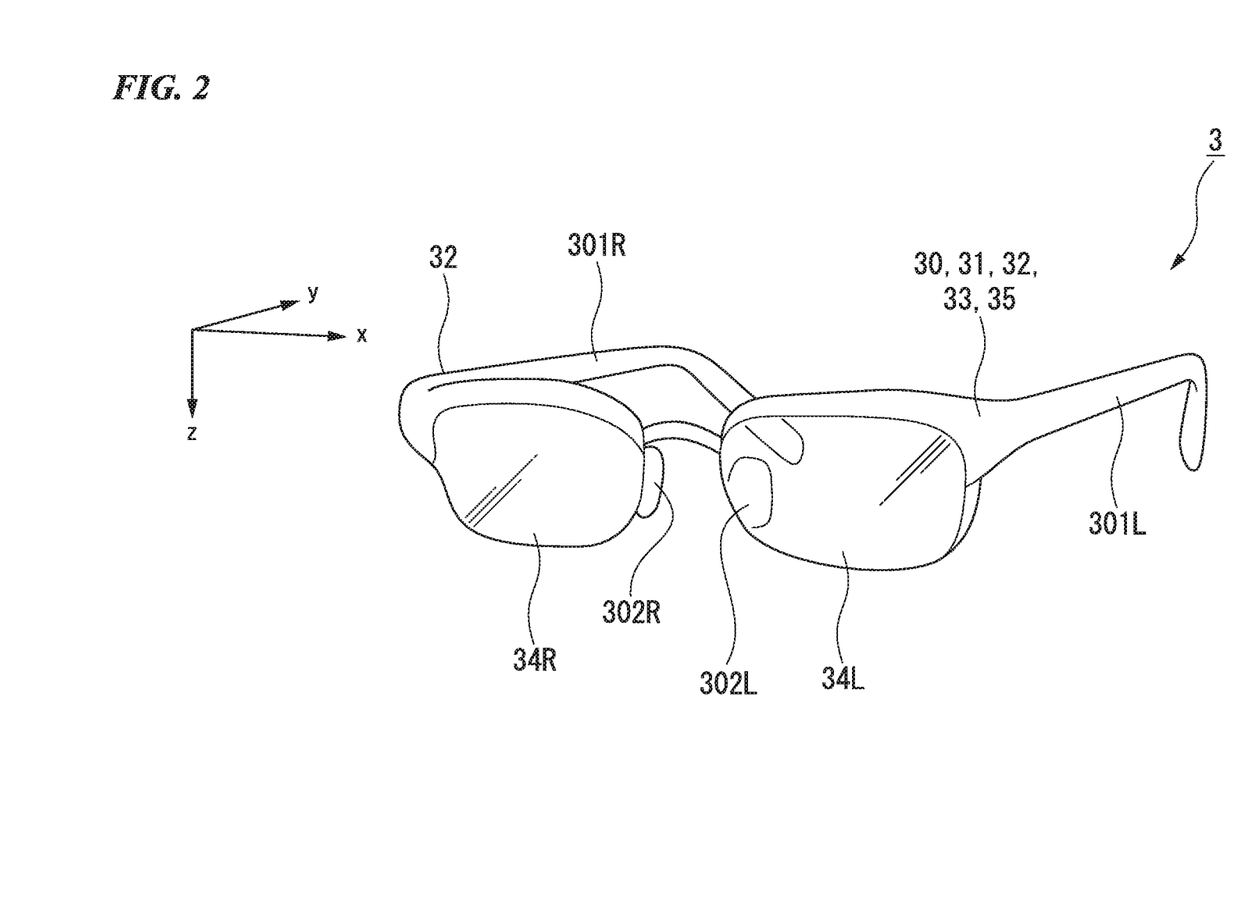
FIG. 2 is a view showing an example of the appearance of a HMD (Head Mount Display) according to the first embodiment.

FIG. 2 is a view showing an example of the appearance of the HMD 3 according to the present embodiment.

Hereinafter, with respect to a coordinate when the driver is upright on the earth surface and the HMD 3 is mounted on the head, the vertical direction is a z-axis direction, the right-to-left direction is an x-axis direction, and the front-to-rear direction is a y-axis direction when seen from the driver.

As shown in FIG. 2, the HMD 3 of the present embodiment is a glasses-type HMD. The HMD 3 includes right and left display parts 34R, 34L, right and left nose pads 302R, 302L, a bridge 303, and right and left temple parts 301R, 301L. The detection part 32 is attached to the inside of the right and left temple parts 301R, 301L, and the operation part 30, the reception part 31, the detection part 32, the information generation part 33, and the transmission part 35 are attached to the inside of the left temple part 301L. The configuration shown in FIG. 2 is an example, and the position to which each part is attached is not limited thereto.

Figure 3:
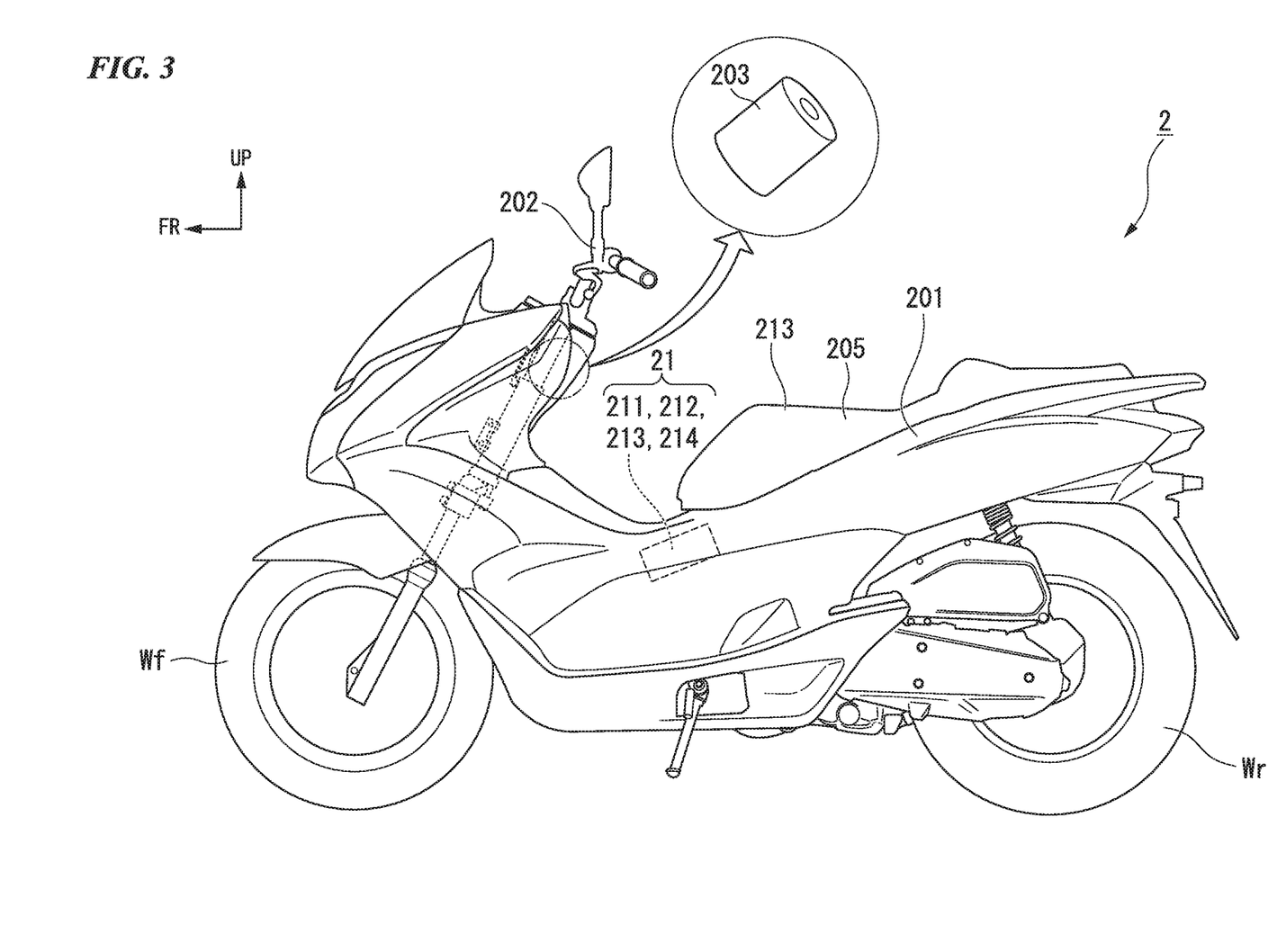
FIG. 3 is a view showing an example of the appearance of a vehicle according to the first embodiment.

FIG. 3 is a view showing an example of the appearance of the vehicle 2 according to the present embodiment. In FIG. 3, an arrow FR indicates a frontward direction of the vehicle 2, and an arrow UP indicates an upward direction of the vehicle 2.

As shown in FIG. 3, the vehicle 2 of the present embodiment is a scooter saddle-riding-type vehicle. The vehicle 2 includes a vehicle body cover 201, a steering handle 202, a key cylinder 203, a front wheel Wf, a rear wheel Wr, a seat 213, and the like. For example, the tilt detection unit 221, the rotation angle detection unit 222, the position detection unit 223, and the vehicle speed detection unit 224 are provided on the inner side of the vehicle body cover 201. The configuration shown in FIG. 3 is an example, and the position to which each unit is attached is not limited thereto.

Figure 4:
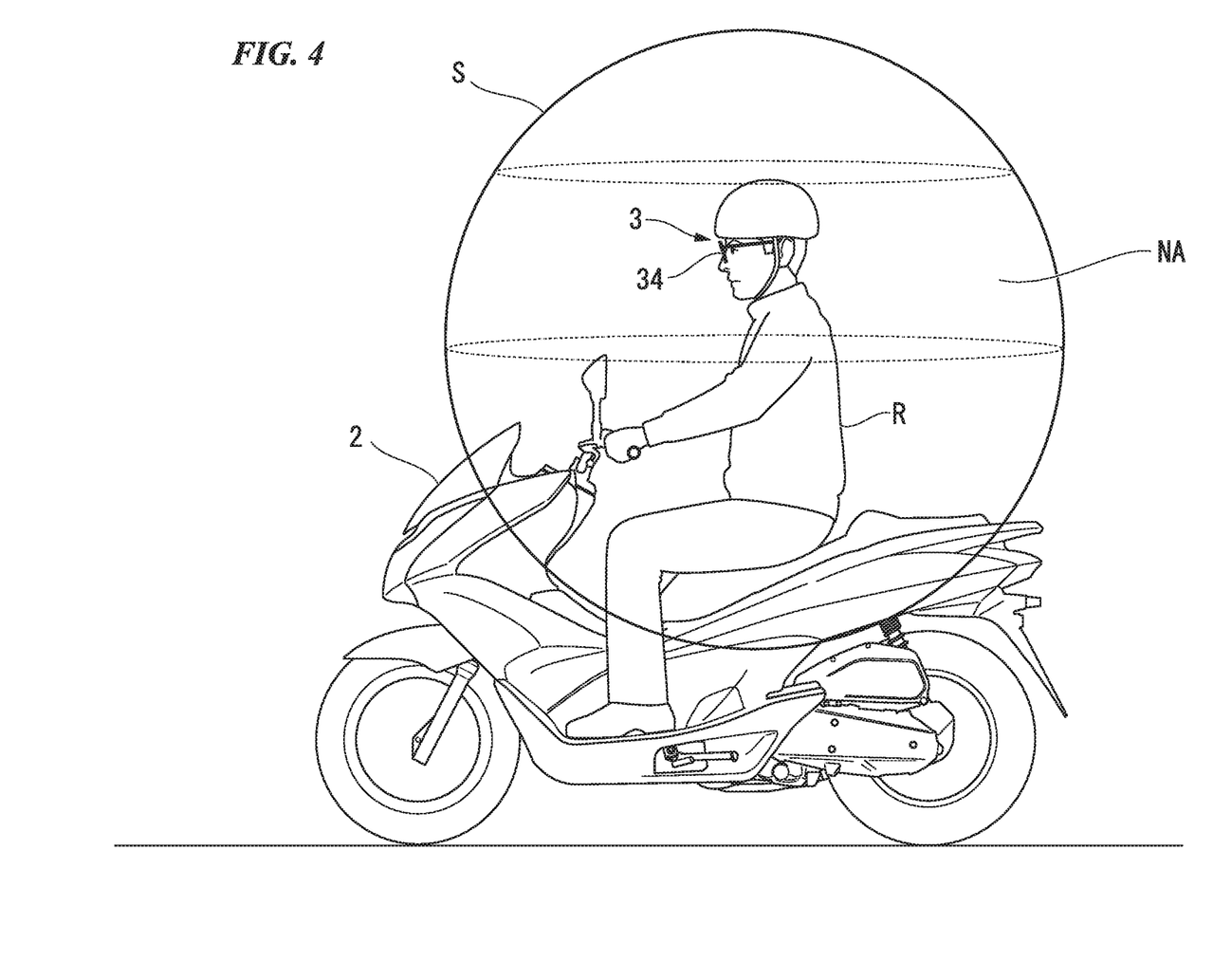
FIG. 4 is a view showing an example of information that is displayed on a display part according to the first embodiment.

Next, an image that is displayed on the display part 34 of the HMD 3 is described. FIG. 4 is a view showing a display image of the display part 34 according to the first embodiment of the present invention.

As shown in FIG. 4, a driver R drives the vehicle 2 while mounting the HMD 3 on the head.

The display part 34 of the HMD 3 allows external light to transmit through the display part 34 and displays a variety of information images by using the hologram. The information images include vehicle speed information, time information, vehicle position information, navigation information, and the like. The driver R views an external image and vision information that is projected by the projection unit as a virtual image via a combiner and thereby can see an information image on a spherical surface S of the spherical body throughout the entire range of the sight of the driver R. Thereby, according to the present embodiment, for example, the driver R can see map information by looking at the driver's leg direction when stopping. The driver R can confirm information from a variety of traffic apparatuses by looking over the head.

It is necessary for the image that is displayed on the display part 34 not to affect the drive operation of the driver R. That is, when a place on which the driver R is focusing when driving the vehicle 2 and an image of the display part 34 are overlapped with each other, there may be cases in which the driver R cannot perform a prompt determination.

Therefore, it is necessary to allow the region on which the driver R is focusing while driving to be a non-display region on the display part 34. The upper and lower widths of the non-display region may be, for example, based on the characteristics of human sight and may be, for example, about 60 degrees on the upper side and about 70 degrees on the lower side. The example shown in FIG. 4 is described using an example in which the non-display region is provided in the upper and lower directions of the field of view; however, the embodiment is not limited thereto. The non-display region may be provided in the right and left directions and, for example, may be about 60 degrees on the inner side and 90 degrees on the outer side on the basis of the characteristics of the field of view of a human.

Figure 5A:
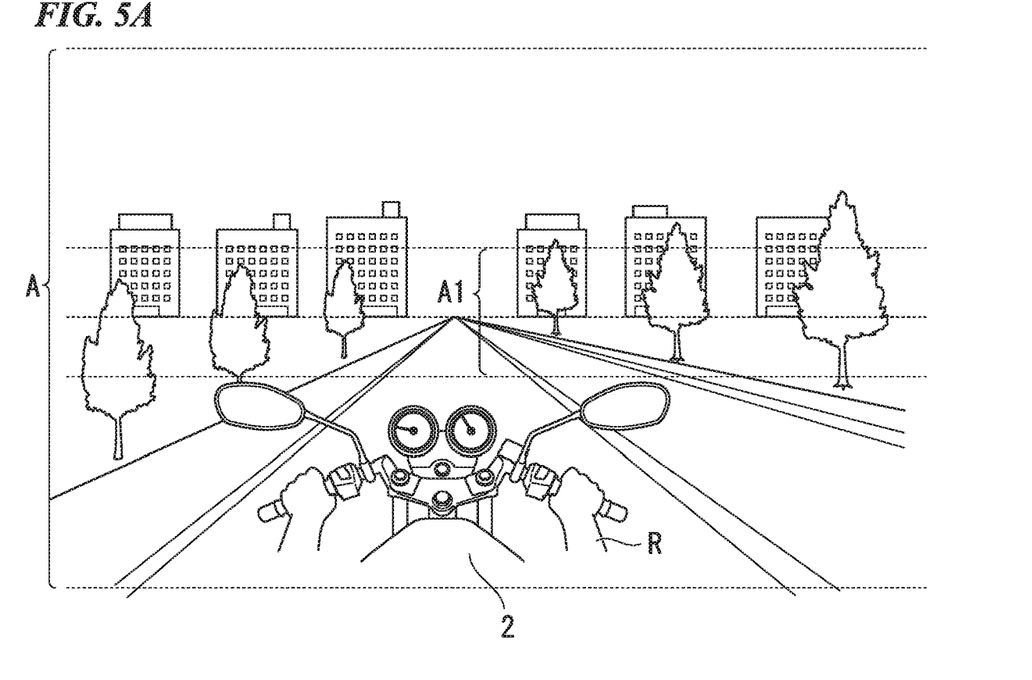
FIG. 5A is a view showing an image seen by an eye line of a driver when driving a two-wheel vehicle.
Figure 5B:
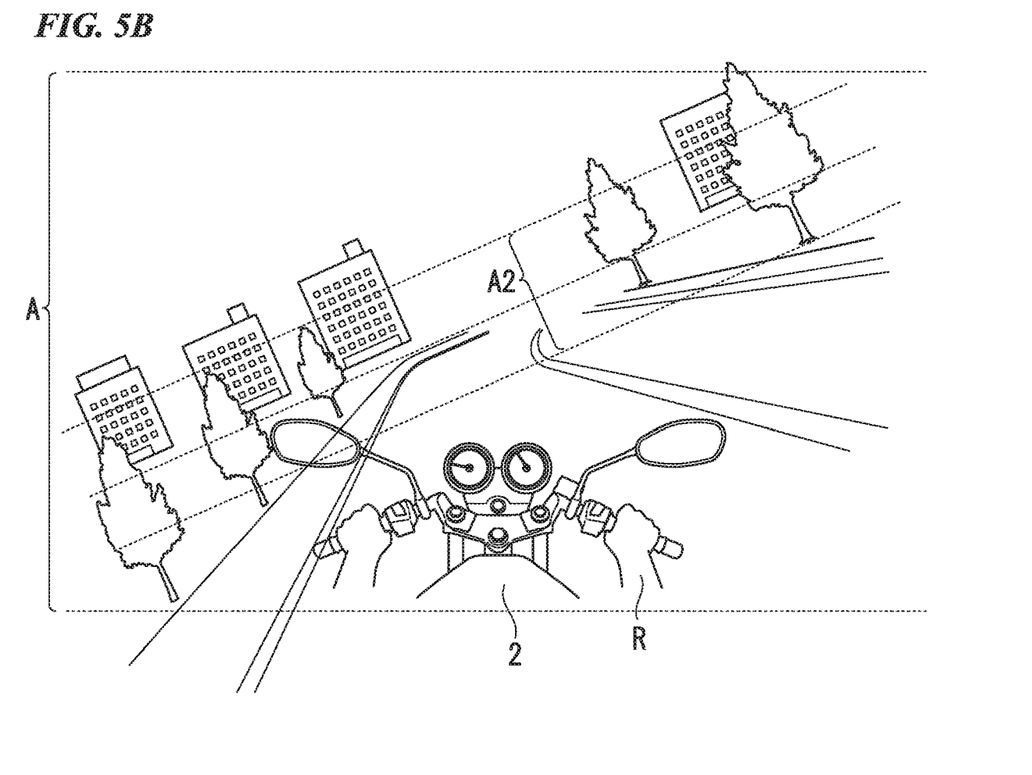
FIG. 5B is a view showing an image seen by the eye line of the driver when driving the two-wheel vehicle.

FIG. 5 is a view showing an image seen by the eye line of the driver R when driving a two-wheel vehicle 2. FIG. 5A shows an image when traveling on a straight road. FIG. 5B shows an image when traveling on a right-hand curve. In FIG. 5A and FIG. 5B, a region A represents a range which the driver R can view from the display part 34.

The driver R driving the vehicle 2 continues driving while focusing on information on the road.

The road is curved to a right or left direction. Further, a variety of obstacles such as sudden rushing out of a pedestrian, sudden stopping of a frontward vehicle, and a presence of a fallen object are present on the road. All of these obstacles are events on the ground surface. Accordingly, the driver R travels while focusing on an object positioned with reference to the horizon.

As shown in FIG. 5A, when seen from the eye line of the driver R during traveling on a straight road, what is seen on the uppermost side is the sky, a long-distance view on the road is present below the sky, and a short-distance view on the road is present below the long-distance view. The important information for the driver R when driving and traveling among the information obtained from the eye line of the driver R is in a range indicated by a region A1 which becomes information on the road in a braking range of the vehicle 2. The driver R is driving the vehicle 2 while focusing on the range indicated by the region A1. Accordingly, it is necessary for the HMD 3 to allow the region A1 to be the non-display region on the display part 34.

On the other hand, FIG. 5B shows an image seen by the eye line of the driver R when traveling on a right-hand curve. As shown in FIG. 5B, the driver R travels on the right-hand curve while tilting the vehicle body to the right side. Therefore, when seen by the eye line of the driver R, as shown in FIG. 5B, the horizon is tilted toward a right upper direction. When the horizon is tilted toward the right upper direction, information on the road in the braking range of the vehicle 2 by the eye line of the driver R is in a range indicated by a region A2 in FIG. 5B. The driver R drives the vehicle 2 while focusing on the range indicated by the region A2. Accordingly, in a case of the right-hand curve, it is necessary for the HMD 3 to allow the region A2 to be the non-display region on the display part 34.

In this way, when driving the two-wheel vehicle 2, what is most focused on seen from the eye line of the driver R is information on the road with reference to the horizon. When traveling while tilting the vehicle body, the horizon is tilted by being seen from the eye line of the driver R. Therefore, when traveling while tilting the vehicle body, it is necessary to set the non-display region on the display part 34 with reference to the tilted horizon.

Therefore, in the present embodiment, a tilt in the roll direction of the head of the driver R is detected, a virtual horizon is set based on the tilt in the roll direction of the head of the driver R, and a range from a line that is separated by a predetermined distance in the upward direction from the virtual horizon to a line that is separated by a predetermined distance in the downward direction from the virtual horizon is set in a band shape as the non-display region on the display part 34. The reason for setting the non-display region in the band shape is to ensure the sight in the right and left directions. That is, the driver R of the vehicle 2 frequently rotates the head in the right and left directions so as to confirm the right and left directions during traveling. Specifically, when wearing a full-face helmet, in most cases, the head is greatly rotated. In order not to affect the driving when the driver R of the vehicle 2 rotates the head in the right and left directions, the non-display region is set in the band shape on the display part 34, and all of the right-to-left regions are allowed to be the non-display region.

The present embodiment employs, as shown in FIG. 4, a display part 34 in which a three-dimensional space is simulated on a virtual spherical body that centers the driver R, and an information image is projected on a spherical surface of the spherical body. When using such a display part 34, as shown in FIG. 4, the non-display region NA having a band shape is a region in which end parts are connected to each other on the spherical surface and which is formed in an annular band shape.

Figure 6A:
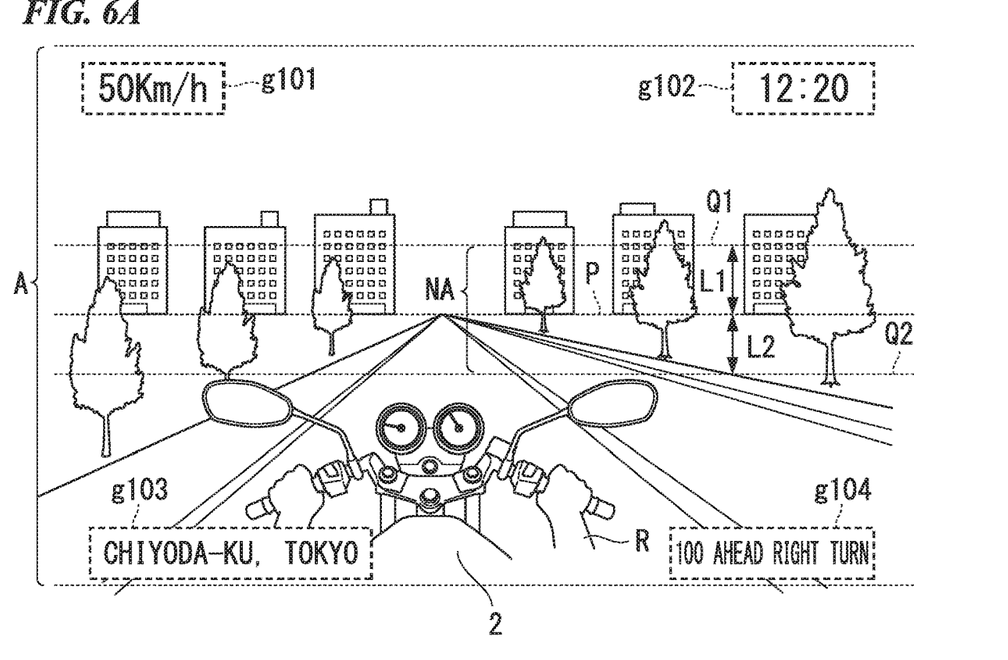
FIG. 6A is a view showing a display image of the display part according to the first embodiment.
Figure 6B:
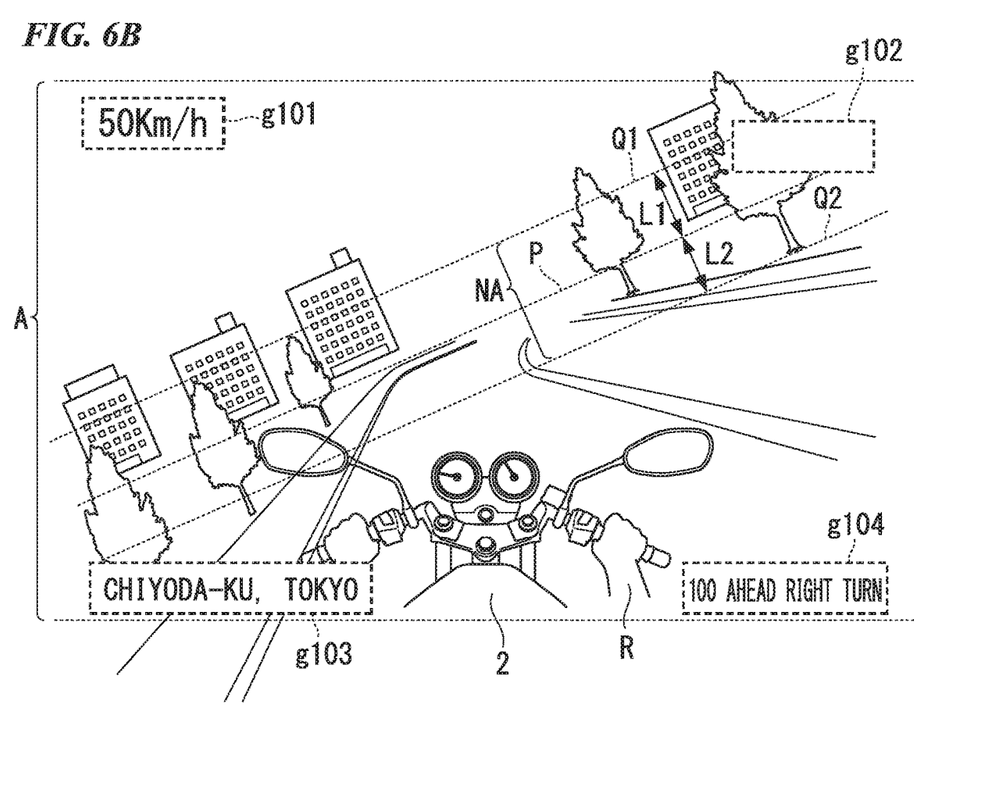
FIG. 6B is a view showing a display image of the display part according to the first embodiment.

FIG. 6 is a view showing an example of information that is displayed on the display part 34 according to the present embodiment. FIG. 6A is a display example when the head of the driver R is tilted little relative to the ground surface. FIG. 6B is a display example when the head of the driver R is tilted on the right side relative to the ground surface. In FIG. 6A and FIG. 6B, a region A represents a range which the driver R is capable of viewing from the display part 34 similarly to FIG. 5, and a region NA is the non-display region. The displayed image is an image obtained by superimposing information of regions surrounded by chain lines g101, g102, g103, g104 on an external image. The information of the region surrounded by the chain line g101 is, for example, vehicle speed information. The information of the region surrounded by the chain line g102 is, for example, time information. The information of the region surrounded by the chain line g103 is, for example, current location information. The information of the region surrounded by the chain line g104 is, for example, navigation information. The non-display region NA is set on the display part 34.

In FIG. 6A, the head of the driver R is tilted little relative to the ground surface. In this case, when a virtual horizon P is set based on the tilt in the roll direction of the head of the driver, as shown in FIG. 6A, the virtual horizon P becomes substantially parallel with the horizontal direction of the display part 34. The non-display region NA is set in a band shape within a range between a line that is separated by a predetermined distance L1 (first distance) in the upward direction from the virtual horizon P and a line that is separated by a predetermined distance L2 (second distance) in the downward direction from the virtual horizon P. A range between a boundary line Q1 (first boundary line) and a boundary line Q2 (second boundary line) is the non-display region NA. As shown in FIG. 6A, all of the positions of the left upper chain line g101, the right upper chain line g102, the left lower chain line g103, and the right lower chain line g104 are outside the non-display region NA. Therefore, even when an image is displayed in the chain line g101, the chain line g102, the chain line g103, and the chain line g104, it is possible for the driver R to ensure the sight for driving and traveling.

In FIG. 6B, the driver R tilts the vehicle body to the right side, and the head of the driver R is tilted to the right side with respect to the ground surface. In this case, when the virtual horizon P is set based on the tilt in the roll direction of the head of the driver, as shown in FIG. 6B, the virtual horizon P becomes tilted in the right upper direction relative to the horizontal direction of the display part 34. The non-display region NA is set in a band shape within a range between a line that is separated in the upward direction by a predetermined distance L1 from the virtual horizon P directed in the rightward upward direction and a line that is separated in the downward direction by a predetermined distance L2 from the virtual horizon P directed in the rightward upward direction. In this case, the information indicated by the chain line g101 is at the inside of the display region A and at the outside of the non-display region NA and is therefore displayed. The information indicated by the chain line g102 is within the non-display region and is therefore erased. The information indicated by the chain line g103 and the chain line g104 is at the inside of the display region A and at the outside of the non-display region NA and is therefore displayed as is. In this way, the information that is indicated by the chain line g102 and that enters the non-display region NA is erased from the display part 34, and therefore, it is possible to ensure the sight of the driver R. As shown in FIG. 6B, in the embodiment, even in a state where the vehicle body is tilted, the non-display region NA is tilted so as to be horizontal with respect to the virtual horizon P, but the information that is displayed on the display part 34 is not tilted. This is because, even in a state where the vehicle body is tilted, there may be cases in which the driver R does not tilt the body, that is, the HMD 3 is not tilted.

In the embodiment, the distance L1 from the virtual horizon P to the boundary line Q1 on the upper side of the non-display region NA is shorter than the distance L2 from the virtual horizon P to the boundary line Q2 on the lower side of the non-display region NA. The reason for this is to widely ensure the region of the information image while supposing the urgency at the drive operation. That is, the upper side on the screen of the display part 34 becomes a long-distance scene when seen from the driver R, and the lower side on the screen becomes a short-distance scene when seen from the driver R. An event having high urgency is specifically an event that occurs at the short distance when seen from the driver R. Therefore, by allowing the distance L2 from the virtual horizon P to the boundary line Q2 on the lower side to be long, a region that requires confirmation when traveling is ensured. Further, by allowing the distance L1 from the virtual horizon P to the boundary line Q1 on the upper side to be short, it is possible to widely ensure a region in which the information image is displayed.

Figure 7:
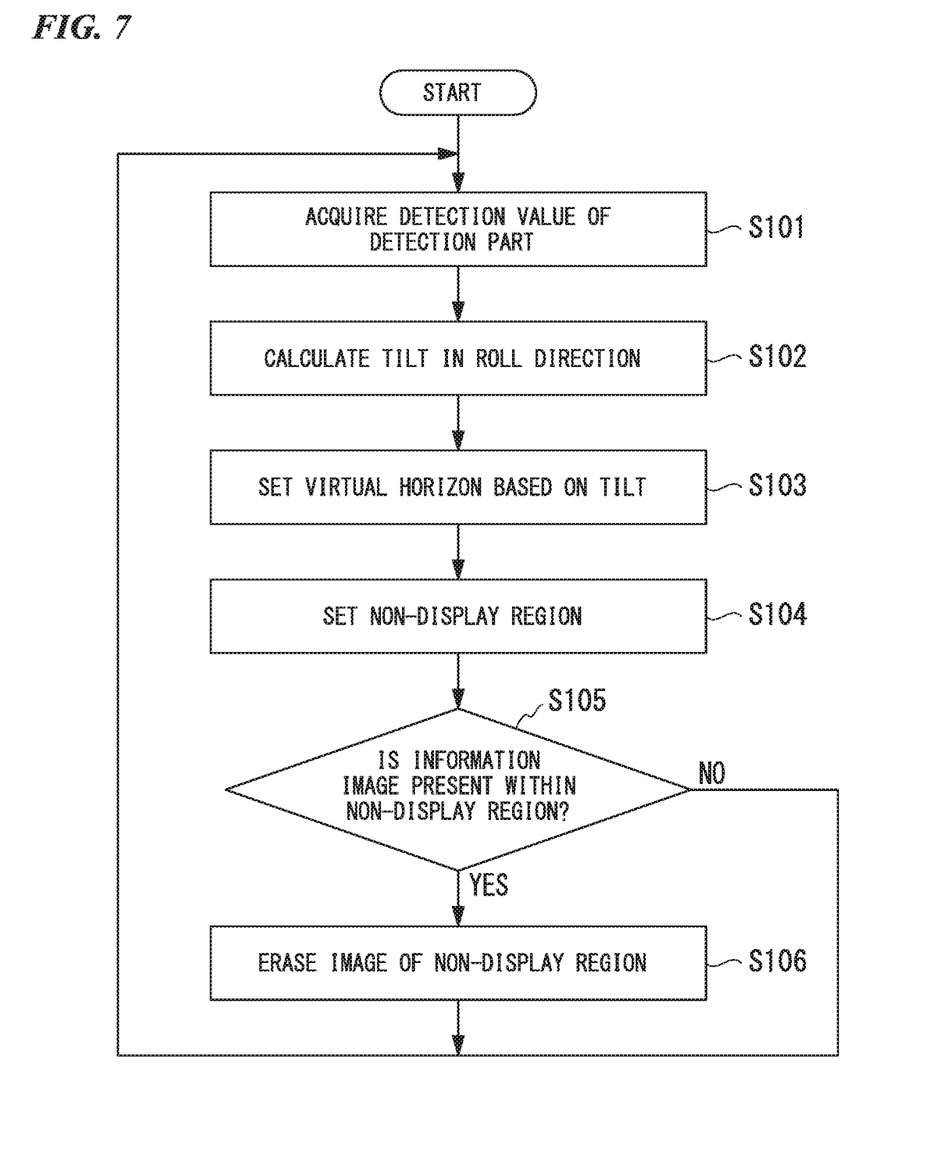
FIG. 7 is a flowchart showing a process when setting a non-display region in the HMD according to the first embodiment.

FIG. 7 is a flowchart showing a process when setting a non-display region in the HMD 3 according to the present embodiment.

(Step S101) The control unit 332 acquires a detection value of the detection part 32 and allows the process to proceed to Step S102.

(Step S102) The control unit 332 obtains the tilt in the roll direction of the driver R from the detection value of the detection part 32 and allows the process to proceed to Step S103. As described above, the tilt in the roll direction is a tilt so as to be rotated around the front-to-rear direction of the vehicle 2 as a rotation axis. It is possible for the control unit 332 to detect the tilt of the head of the driver R at three axes of the roll direction, the pitch direction, and the yaw direction by detecting the gravity acceleration by the acceleration sensor 322 and detecting the angular speed in rotation directions of three axes from the angular speed sensor 323.

(Step S103) The control unit 332 sets the virtual horizon P based on the tilt in the roll direction of the head of the driver R.

(Step S104) The control unit 332 sets the non-display region NA such that an upper end of the non-display region NA is separated by the predetermined distance L1 in the upward direction in parallel with respect to the virtual horizon P and a lower end of the non-display region NA is separated by the predetermined distance L2 in the downward direction in parallel with respect to the virtual horizon P.

(Step S105) The control unit 332 determines whether or not an information image is present within the non-display region NA. When an information image is not present within the non-display region NA (Step S105: NO), the control unit 332 allows the process to return to Step S101. When an information image is present within the non-display region NA (Step S105: YES), the control unit 332 allows the process to proceed to Step S106.

(Step S106) The control unit 332 erases the information image that is present within the non-display region NA and allows the process to return to Step S101.

As described above, in the present embodiment, the non-display region is set in a band shape within a range between a line that is separated by a predetermined distance in the upward direction with respect to the virtual horizon that is set based on the tilt of the head of the driver R and a line that is separated by a predetermined distance in the downward direction with respect to the virtual horizon. Therefore, when the driver R is driving the vehicle 2 while tilting the vehicle body, it is possible to ensure the sight of the driver R. Further, in the present embodiment, the non-display region is set in a band shape, and the right and left areas of the screen are the non-display regions. Therefore, when the driver R confirms the right and left direction, it is possible to easily and promptly confirm the environment.

Second Embodiment

Figure 8A:
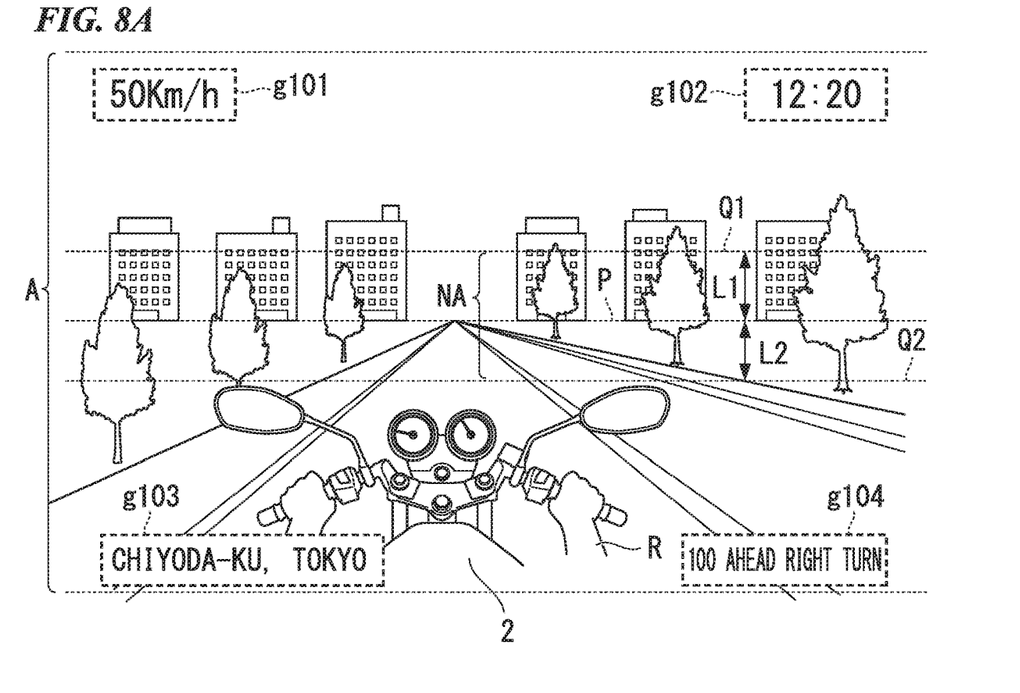
FIG. 8A is a view showing an example of information that is displayed on a display part according to a second embodiment.
Figure 8B:
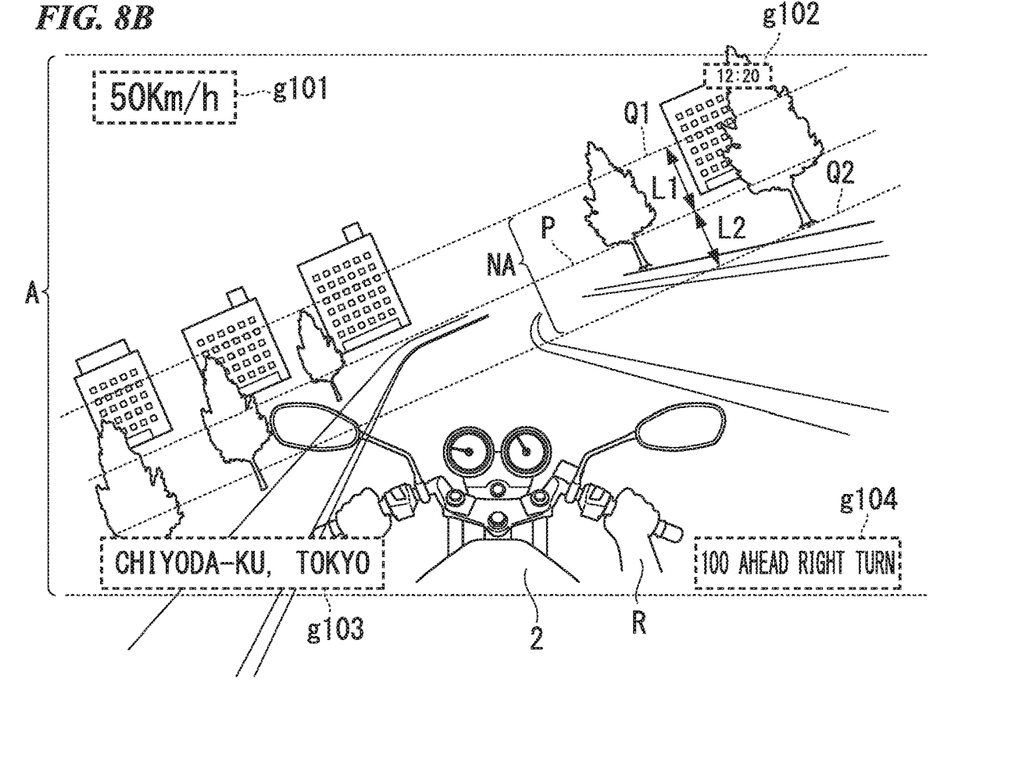
FIG. 8B is a view showing an example of information that is displayed on the display part according to the second embodiment.

Next, a second embodiment of the present invention is described. FIG. 8 is a view showing an example of information that is displayed on the display part 34 in the second embodiment of the present invention. In FIG. 8A and FIG. 8B, a region A represents a range which the driver R can view from the display part 34 similarly to FIG. 5A, FIG. 5B, FIG. 6A, and FIG. 6B, and a region NA represents a non-display region. The fundamental configuration of the second embodiment is similar to that of the first embodiment described above.

Similarly to the first embodiment described above, in the present embodiment, a virtual horizon is set based on the tilt in the roll direction of the head of the driver R, and a range between a line that is separated by a predetermined distance in the upward direction with respect to the virtual horizon and a line that is separated by a predetermined distance in the downward direction with respect to the virtual horizon is set in a band shape as a non-display region. In the first embodiment described above, the image of the information that comes within the non-display region NA is erased. On the other hand, in this embodiment, the image of the information that comes within the non-display region NA is shrunk and displayed.

In FIG. 8A, the head of the driver R is tilted little relative to the ground surface. In this case, when the virtual horizon P is set based on the tilt in the roll direction of the head of the driver, as shown in FIG. 8A, the virtual horizon P becomes substantially parallel with the horizontal direction of the display part 34. The non-display region NA is set in a band shape within the range between the line that is separated by a predetermined distance L1 in the upward direction with respect to the virtual horizon P and the line that is separated by a predetermined distance L2 in the downward direction with respect to the virtual horizon P. A range between a boundary line Q1 and a boundary line Q2 is the non-display region NA. As shown in FIG. 8A, all of the positions of the left upper chain line g101, the right upper chain line g102, the left lower chain line g103, and the right lower chain line g104 are outside the non-display region NA. Therefore, even when an image is displayed in the chain line g101, the chain line g102, the chain line g103, and the chain line g104, it is possible to ensure the sight of the driver R.

In FIG. 8B, the driver R tilts the vehicle body to the right side, and the head of the driver R is tilted to the right side with respect to the ground surface. In this case, when the virtual horizon P is set based on the tilt in the roll direction of the head of the driver, as shown in FIG. 8B, the virtual horizon P becomes tilted in the right upper direction relative to the horizontal direction of the display part 34. The non-display region NA is set in a band shape within a range between a line that is separated by a predetermined distance L1 in the upward direction with respect to the virtual horizon P directed in the rightward upward direction and a line that is separated by a predetermined distance L2 in the downward direction with respect to the virtual horizon P directed in the rightward upward direction. A range between a boundary line Q1 and a boundary line Q2 is the non-display region NA. In this case, the information indicated by the chain line g101, the chain line g103, and the chain line g104 is at the inside of the display region A and at the outside of the non-display region NA and is therefore displayed as is. The information indicated by the chain line g102 comes within the non-display region NA and is therefore shrunk and displayed so as to depart from the non-display region NA.

In this way, in the present embodiment, the information that is indicated by the chain line g102 and that comes within the non-display region NA is shrunk and displayed so as to be out of the non-display region NA. Therefore, according to the present embodiment, it is possible to obtain required information while ensuring the sight of the driver R.

Third Embodiment

Figure 9:
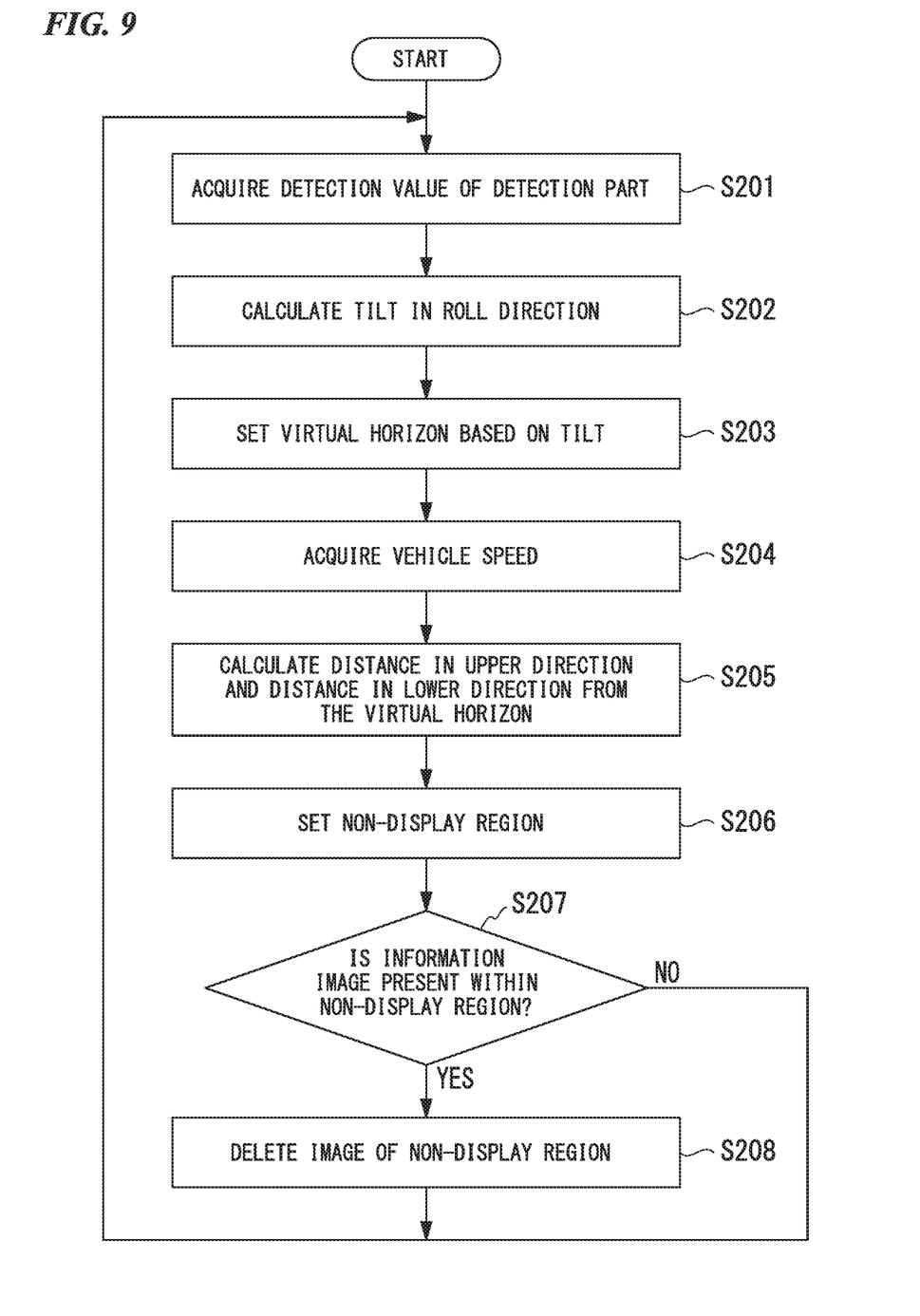
FIG. 9 is a flowchart showing a process when setting a non-display region in a HMD according to a third embodiment.

Next, a third embodiment of the present invention is described. FIG. 9 is a flowchart showing a process when setting a non-display region in a HMD according to the third embodiment of the present invention. The fundamental configuration of the third embodiment is similar to that of the first embodiment described above.

In the first embodiment described above, as shown in FIG. 6, the distance L1 from the virtual horizon P to the boundary line Q1 on the upper side of the non-display region NA and the distance L2 from the virtual horizon P to the boundary line Q2 on the lower side of the non-display region NA are fixed to predetermined distances. On the other hand, in the present embodiment, the distance L1 and the distance L2 are appropriately set in accordance with the speed of the vehicle 2.

That is, in FIG. 6, the upper side on the screen becomes a long-distance scene when seen from the driver R, and the lower side on the screen becomes a short-distance scene when seen from the driver R. The driver R focuses on short-distance information when the speed of the vehicle 2 is slow, and the driver R focuses on a longer distance when the speed of the vehicle 2 is fast. Thereby, in the present embodiment, the relationship between the distance L1 and the distance L2 is changed in accordance with the speed of the vehicle 2. That is, when the speed of the vehicle 2 is slow, the distance L1 is set to be short, and the display region on the upper side from the virtual horizon P is widely ensured. When the speed of the vehicle 2 becomes fast, the distance L2 is shortened, and the display region on the lower side from the virtual horizon P is widely ensured.

FIG. 9 is a flowchart showing a process when setting a non-display region in the HMD 3 according to the third embodiment of the present invention.

(Step S201) The control unit 332 acquires a detection value of the detection part 32 and allows the process to proceed to Step S202.

(Step S202) The control unit 332 obtains the tilt in the roll direction of the driver R from the detection value of the detection part 32 and allows the process to proceed to Step S203.

(Step S203) The control unit 332 sets the virtual horizon P based on the tilt in the roll direction of the head of the driver R and allows the process to proceed to Step S204.

(Step S204) The control unit 332 acquires vehicle speed information from the speed sensor 324 of the detection part 32 and allows the process to proceed to Step S205.

(Step S205) The control unit 332 calculates the distance L1 from the virtual horizon P to the boundary line Q1 on the upper side of the non-display region NA and the distance L2 from the virtual horizon P to the boundary line Q2 on the lower side of the non-display region NA in accordance with the vehicle speed information and allows the process to proceed to Step S206.

(Step S206) The control unit 332 sets a region between a line that is separated by a predetermined distance L1 in the upward direction in parallel with respect to the virtual horizon P and a line that is separated by a predetermined distance L2 in the downward direction in parallel with respect to the virtual horizon P as the non-display region NA. At this time, the distances L1, L2 are set in accordance with the vehicle speed as shown in Step S205.

(Step S207) The control unit 332 determines whether or not an information image is present within the non-display region NA. When an information image is not present within the non-display region NA (Step S207: NO), the control unit 332 allows the process to return to Step S201. When an information image is present within the non-display region NA (Step S207: YES), the control unit 332 allows the process to proceed to Step S208.

(Step S208) The control unit 332 erases the information image that is present within the non-display region NA and allows the process to return to Step S201.

In this way, in the present embodiment, it is possible to optimally set the non-display region NA in accordance with the speed of the vehicle 2.

Fourth Embodiment

Next, a fourth embodiment of the present invention is described.

Figure 10:
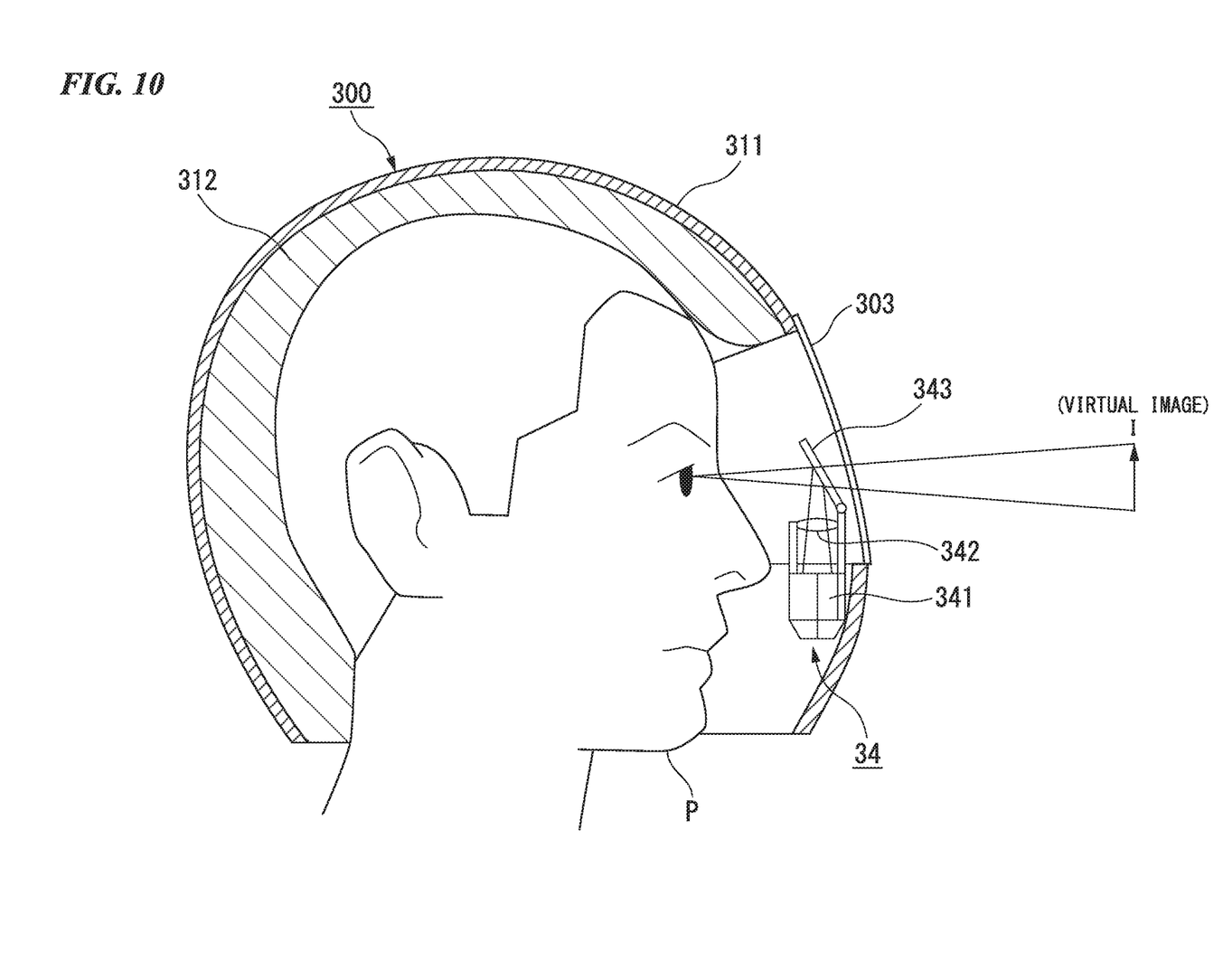
FIG. 10 is a view showing an example of the appearance of a HMD according to a fourth embodiment.

FIG. 10 is a view showing an example of the appearance of a HMD 3 according to the fourth embodiment of the present invention. As shown in FIG. 10, in this embodiment, a helmet-type HMD is used as the HMD 3.

In FIG. 10, the HMD 3 is attached to a helmet 300. As shown in FIG. 10, the helmet 300 includes a hat body (shell) 311, an impact absorption liner 312, and a shield 313. The display part 34 of the HMD 3 includes a projection unit 341, a lens 342, and a combiner 343.

The projection unit 341 outputs visual information to the combiner 343 via the lens 342. The lens 342 focuses the visual information that is output by the projection unit 341 on the combiner 343. The combiner 343 is a half mirror that allows a frontward scene of the driver R and an image to be seen to be overlapped with each other. It is possible for the driver R to view the external image and the vision information that is projected by the projection unit 341 as a virtual image I via the combiner 343.

The first to third embodiments are described using an example in which the road surface is horizontal; however, the embodiment is not limited thereto. For example, when the vehicle 2 is traveling on a rising slope, the control unit 332 may determine that the vehicle 2 is traveling on a rising slope on the basis of the detection value that is detected by the detection part 22 and may correct the position of the virtual horizon by moving the virtual horizon to a higher position than the position shown in FIG. 6 and the like. Alternatively, when the vehicle 2 is traveling on a descending slope, the control unit 332 may determine that the vehicle 2 is traveling on a descending slope on the basis of the detection value that is detected by the detection part 22 and may correct the position of the virtual horizon by moving the virtual horizon to a lower position than the position shown in FIG. 6 and the like. That is, the control unit 332 may correct the position of the virtual horizon in accordance with the situation of the road surface such as the slope of the road surface.

Thereby, according to the embodiments, it is possible to ensure the sight in accordance with the situation of the road surface.

A program for realizing all or some of the functions of the vehicle detection system 1 may be recorded in a computer-readable recording medium, and the program recorded in the recording medium may be read into and executed on a computer system to thereby perform the process of each part. The term "computer system" used herein includes an OS or hardware such as peripherals.

Further, the term "computer system" also includes a homepage provision environment (or display environment) when utilizing a WWW system.

Further, the term "computer-readable recording medium" refers to portable media such as a flexible disk, a magneto-optical disc, a ROM, and a CD-ROM and a storage device such as a hard disk embedded in the computer system. Further, the term "computer-readable recording medium" includes a recording medium that holds a program dynamically for a short period of time like a network such as the Internet or a communication line when a program is transmitted through a communication line such as a telephone line and includes a recording medium that stores a program for a certain period of time like a volatile memory in a computer system which serves as a server or a client in that case. Further, the above program may be a program for realizing some of the functions described above or may be a program capable of realizing the above functions by the combination with a program already recorded in the computer system.

Although the embodiments of the invention have been described in detail with reference to the drawings, a specific configuration is not limited to the embodiments, and design changes and the like without departing from the scope of the invention are also included.

DESCRIPTION OF THE REFERENCE SYMBOLS

1: VEHICLE DETECTION SYSTEM
3: HMD
21: CONTROL PART
22: DETECTION PART
23: RECEPTION PART
24: TRANSMISSION PART
30: OPERATION PART
31: RECEPTION PART
32: DETECTION PART
33: INFORMATION GENERATION PART
34: DISPLAY PART

35: TRANSMISSION PART
221: TILT DETECTION UNIT
222: ROTATION ANGLE DETECTION UNIT
223: POSITION DETECTION UNIT
224: VEHICLE SPEED DETECTION UNIT
300: HELMET
321: MAGNETIC SENSOR
322: ACCELERATION SENSOR
323: ANGULAR SPEED SENSOR
324: SPEED SENSOR
331: STORAGE UNIT
332: CONTROL UNIT
333: IMAGE GENERATION UNIT
P: VIRTUAL HORIZON
A: DISPLAY REGION
A1, A2: NON-DISPLAY REGION
Q1: FIRST BOUNDARY LINE
Q2: SECOND BOUNDARY LINE
L1: FIRST DISTANCE
L2: SECOND DISTANCE

The invention claimed is:

1. An image display apparatus having a display part that is arranged on a mount body which is mounted on a head of a user, the image display apparatus comprising:
   a detection part that detects a tilt of a head of the user; and
   a control part that sets a virtual horizon based on the tilt which is detected by the detection part and that sets a non-display region having a band shape which is parallel to the virtual horizon,
   wherein the non-display region is a region between a first boundary line that is provided by a first distance in an upper direction from and in parallel with the virtual horizon and a secondary boundary line that is provided by a second distance in a lower direction from and in parallel with the virtual horizon.

2. The image display apparatus according to claim 1, wherein the first distance is shorter than the second distance.

3. The image display apparatus according to claim 1, comprising
   a speed detection part that detects a movement speed,
   wherein the control part changes a relationship between the first distance and the second distance in accordance with the movement speed that is detected by the speed detection part.

4. The image display apparatus according to claim 3, wherein the control part shortens the second distance when the movement speed that is detected by the speed detection part is fast, and
   the control part shortens the first distance when the movement speed is slow.

5. The image display apparatus according to claim 1, wherein, when an information image and a region that is set as the non-display region are overlapped with each other, the control part erases the information image.

6. The image display apparatus according to claim 1, wherein, when an information image and a region that is set as the non-display region are overlapped with each other, the control part shrinks the information image to a size in which the information image is not overlapped with the non-display region and displays the shrunk information image.

7. The image display apparatus according to claim 5, wherein the display part simulates a three-dimensional space on a virtual spherical body that centers a user, projects the information image on a spherical surface of the virtual spherical body, and forms the non-display part on the spherical surface in an annular band shape.

8. An image display method which controls an image display apparatus having a display part that is arranged on a mount body which is mounted on a head of a user, the image display method comprising:
   by way of a detection part, detecting a tilt of a head of the user; and
   by way of a control part, setting a virtual horizon based on the detected tilt and setting a non-display region having a band shape that is parallel to the virtual horizon,
   wherein the non-display region is a region between a first boundary line that is provided by a first distance in an upper direction from and in parallel with the virtual horizon and a second boundary line that is provided by a second distance in a lower direction from and in parallel with the virtual horizon.

* * * * *